United States Patent
Chang et al.

(10) Patent No.: US 10,152,642 B2
(45) Date of Patent: Dec. 11, 2018

(54) METHOD FOR DETECTING DRIVING BEHAVIOR AND SYSTEM USING THE SAME

(71) Applicant: AUTOMOTIVE RESEARCH & TESTING CENTER, Changhua County (TW)

(72) Inventors: Ming-Fang Chang, Changhua County (TW); Po-Hsiang Liao, Changhua County (TW); Li-You Hsu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 67 days.

(21) Appl. No.: 15/382,108

(22) Filed: Dec. 16, 2016

(65) Prior Publication Data

US 2018/0173974 A1   Jun. 21, 2018

(51) Int. Cl.
  *G06K 9/00* (2006.01)
  *G06K 9/62* (2006.01)
  (Continued)

(52) U.S. Cl.
  CPC ........... *G06K 9/00845* (2013.01); *B60Q 9/00* (2013.01); *G06K 9/00248* (2013.01);
  (Continued)

(58) Field of Classification Search
  CPC ........... G06K 9/00845; G06K 9/00248; G06K 9/6203; B60Q 9/00; G06T 5/20;
  (Continued)

(56) References Cited

U.S. PATENT DOCUMENTS 8,587,440 B2 * 11/2013 Weng ................... A61B 5/18
                                              340/575
9,842,266 B2 * 12/2017 Bulan ................. G06K 9/4642
  (Continued)

FOREIGN PATENT DOCUMENTS

CN    102567743 A   7/2012
CN    102263937 B   7/2013
  (Continued)

*Primary Examiner* — John B Strege
(74) *Attorney, Agent, or Firm* — Rosenberg, Klein & Lee

(57) ABSTRACT

A method for detecting driving behavior and a system using the same is disclosed. Firstly, at least one user image comprising an arm image and a head behavior image is retrieved. Then, a processor retrieves the arm image to compare with arm sample images stored in a database. The arm image corresponds to the arm sample image to determine a normal driving behavior. The arm image does not correspond to the arm sample image to determine an abnormal driving behavior, whereby the processor retrieves the head behavior image to compare with head regulation-violating sample images stored in the database. The head behavior image does not correspond to the head regulation-violating sample image to determine a normal driving behavior. The head behavior image corresponds to the head regulation-violating sample image to determine an abnormal driving behavior and output a second-level warning signal, thereby warning a driver.

19 Claims, 5 Drawing Sheets

(51) Int. Cl.
*G06T 5/00* (2006.01)
*G06T 5/20* (2006.01)
*B60Q 9/00* (2006.01)
*H04N 7/18* (2006.01)

(52) U.S. Cl.
CPC ............ *G06K 9/6203* (2013.01); *G06T 5/001* (2013.01); *G06T 5/20* (2013.01); *H04N 7/188* (2013.01); *G06T 2207/30201* (2013.01); *G06T 2207/30268* (2013.01)

(58) Field of Classification Search
CPC ........... G06T 5/001; G06T 2207/30268; G06T 2207/30201; H04N 7/183
See application file for complete search history.

(56) References Cited

U.S. PATENT DOCUMENTS

| | | | |
|---|---|---|---|
| 9,886,637 B1* | 2/2018 | Chan | G06K 9/00832 |
| 9,928,433 B1* | 3/2018 | Chan | G06K 9/00845 |
| 9,928,434 B1* | 3/2018 | Chan | G06K 9/00845 |
| 2009/0034794 A1* | 2/2009 | Ishikawa | B60W 40/09 382/103 |
| 2013/0070957 A1 | 3/2013 | Zhang et al. | |
| 2014/0293053 A1 | 10/2014 | Chuang | |
| 2014/0368628 A1* | 12/2014 | Tsou | G06K 9/00845 348/77 |
| 2015/0186714 A1* | 7/2015 | Ren | G06K 9/00369 348/77 |
| 2015/0286885 A1* | 10/2015 | Bulan | G06K 9/00845 382/104 |
| 2017/0006151 A1* | 1/2017 | Doorandish | H04W 4/90 |
| 2017/0061222 A1* | 3/2017 | Hoye | G06K 9/00845 |

FOREIGN PATENT DOCUMENTS

| | | |
|---|---|---|
| CN | 104537798 A | 4/2015 |
| CN | 104751663 A | 7/2015 |
| TW | 479874 M | 6/2014 |
| TW | 201447817 A | 12/2014 |
| TW | 1520076 B | 2/2016 |
| TW | 201621548 A | 6/2016 |
| TW | 201621758 A | 6/2016 |

* cited by examiner

METHOD FOR DETECTING DRIVING BEHAVIOR AND SYSTEM USING THE SAME

BACKGROUND OF THE INVENTION

Field of the Invention

The present invention relates to a behavior detection technology, particularly to a method for detecting driving behavior and a system using the same, which are used to remind a driver of concentrating to drive before the driver is distracted from driving.

Description of the Related Art

With the development of technology, vehicles have become household transportation. However, since the amount of the vehicles increase, traffic accidents have remained stubbornly high every year. According to statistical reports, traffic accidents are mainly resulted from bad driving behaviors, fatigue, or illness of drivers, wherein the bad driving behaviors include using mobile phones, and taking things and food. The behaviors can distract the driver from driving, so that his hands leave a steering wheel. Thus, according to Statute Governing Road Traffic, the person using a handheld mobile phone, holding a cigarette or smoking to affect driving safety of others is fined. Then, the traffic accidents due to the bad driving behaviors will be reduced.

Presently, a monitoring device for detecting bad driving behavior is invented. When a driver is distracted, the device can reminds the driver of concentrating to drive. Nevertheless, the monitoring device uses a camera to capture a face, so as to determine facial characteristics, such as determining whether a line of vision or a face is deflected. Alternatively, the other sensor is used to recognize an abnormal driving behavior, so as to determine whether the driver is distracted. For example, a smoke detection device is used to determine whether the driver smokes. Or otherwise, a signal detector is used to determine whether the driver uses a mobile phone. Since the monitoring devices have more expensive cost and detect the driving behavior after the driver has already been distracted, the monitoring devices also warn the driver after the driver has already been distracted. Due to the fact the driver has been already distracted, the driver has already affected the driving safety of himself and others even if the monitoring devices warn the driver.

Moreover, in recent years, the Internet of things (IoT) is built up. The IoT can manage a motorcade by various vehicle information collected. The information collected by the backend includes a driving behavior detected by a monitor in a vehicle. When the monitor detects that the driver is distracted, the monitor transmits the behavior information to the backend, and the backend stores the driving behavior information to provide a monitoring staff at the backend with monitoring or with managing performance of drivers of a commercial motorcade. However, the monitor has the same drawbacks as the abovementioned monitoring device. The monitor transmits the distraction information to the backend after the driver has already been distracted. Due to the fact the driver has been already distracted, the driver has already affected the driving safety of himself and others even if the backend staff immediately warns the driver.

To overcome the abovementioned problems, the present invention provides a method for detecting behavior and a system using the same, which are used to efficiently detect a forward act before an abnormal behavior of a driver, so as to remind the driver of concentrating to drive before the driver may be distracted, thereby solving the afore-mentioned problems of the prior art.

SUMMARY OF THE INVENTION

A primary objective of the present invention is to provide a method for detecting driving behavior and a system using the same, which detects a forward act before an abnormal behavior of a driver and reminds the driver of concentrating to drive to efficiently improve the driving safety before the driver may be distracted from driving.

Another objective of the present invention is to provide a method for detecting driving behavior and a system using the same, which transmits the present behavior information of a driver to a far-end server, so as to provide the backend staff with monitoring, thereby efficiently overcoming the problem with distracted driving and apparently benefiting driving safety.

To achieve the abovementioned objectives, the present invention provides a method for detecting driving behavior, which comprises: retrieving at least one user image comprising an arm image and a head behavior image; comparing the arm image with a plurality of arm sample images stored in a database to determine whether the arm image corresponds to at least one of the arm sample images: if yes, determining a normal driving behavior; and if no, determining an abnormal driving behavior and executing a step of; generating and outputting a first-level warning signal; and comparing the head behavior image with a plurality of head regulation-violating sample images stored in the database to determine whether the head behavior image corresponds to at least one of the head regulation-violating sample images: if no, determining a normal driving behavior; and if yes, determining an abnormal driving behavior and generating and outputting a second-level warning signal.

The present invention also provides a system for detecting driving behavior, which comprises: a camera device retrieving at least one user image comprising an arm image and a head behavior image; a database storing a plurality of arm sample images and a plurality of head regulation-violating sample images; a processor electrically connected with the camera device and the database, and retrieving the arm image to compare with the arm sample images, and the processor determines a normal driving behavior when the arm image corresponds to at least one of the arm sample images, and the processor determines an abnormal driving behavior and generates and outputs a first-level warning signal when the arm image does not correspond to at least one of the arm sample images, and then the processor retrieves the head behavior image to compare with the head regulation-violating sample images, and the processor determines an abnormal driving behavior and generates and outputs a second-level warning signal when the head behavior image corresponds to at least one of the head regulation-violating sample images, and the processor determines a normal driving behavior when the head behavior image does not correspond to at least one of the head regulation-violating sample images; and a transmission device electrically connected with the processor and controlled by the processor to output the first-level warning and the second-level warning signal.

When the arm image retrieved by the processor does not correspond to at least one of the arm sample images, an abnormal driving behavior is determined. The processor generates the first-level warning signal after the abnormal driving behavior lasts for a given period.

The processor further uses a head deflection algorithm to determine whether a head of a user of the head behavior image is deflected: if yes, generating the second-level warning signal to warn the user of the abnormal driving behavior; and if no, determining the normal driving behavior.

Below, the embodiments are described in detail in cooperation with the drawings to make easily understood the technical contents, characteristics and accomplishments of the present invention.

DETAILED DESCRIPTION OF THE INVENTION

Figure 1:
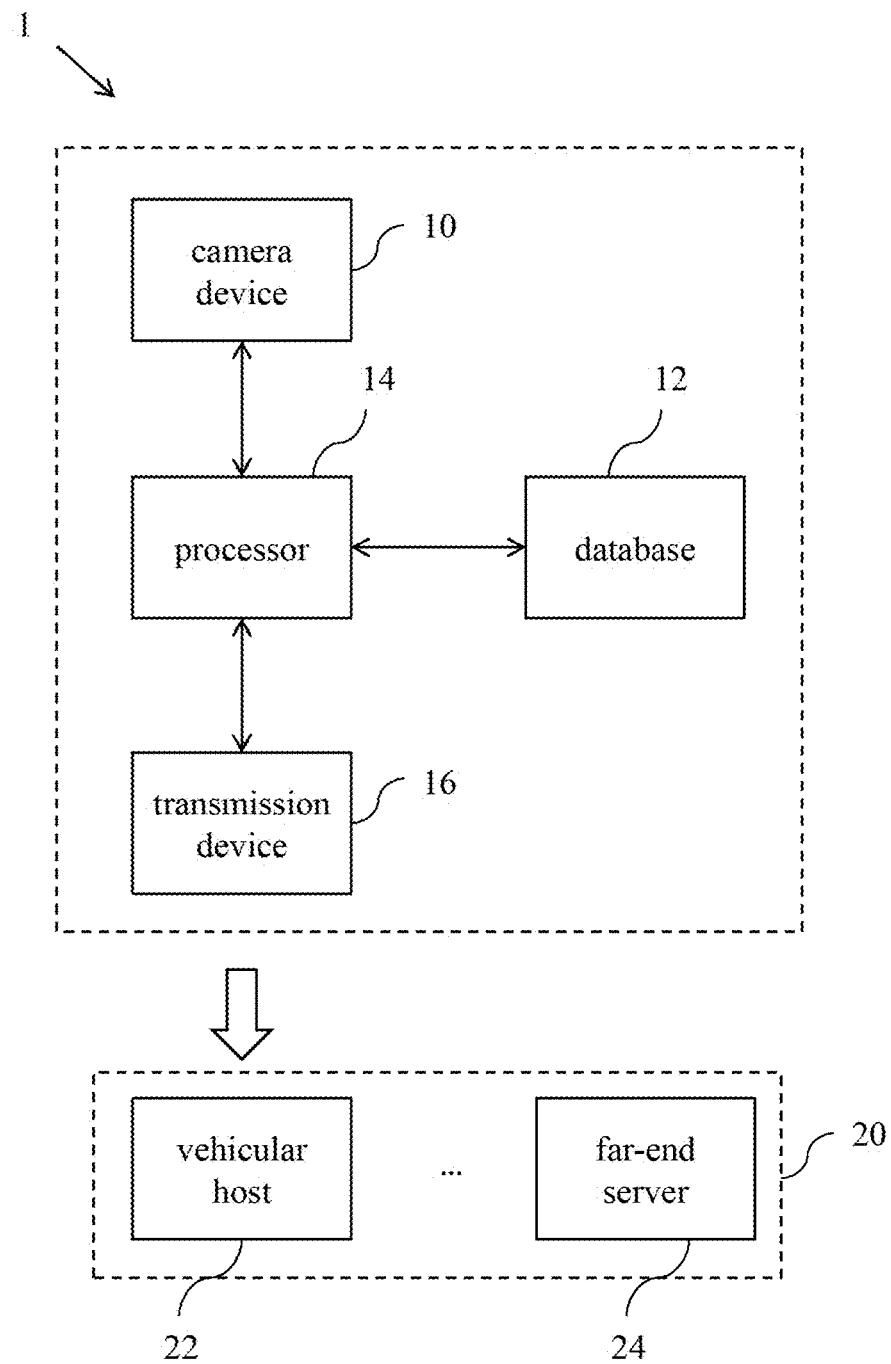
FIG. 1 is a block diagram schematically showing a system for detecting driving behavior according to an embodiment of the present invention.

Refer to FIG. 1 and explain a system 1 for detecting driving behavior. The system 1 for detecting driving behavior comprises a camera device 10, such as a camera that can capture images. The camera device 10 is installed in front of a driving seat, so that the camera device 10 is trained on a driver on the driving seat, so as to retrieve the front driver image as a user image. The user image comprises an arm image and a head behavior image. A database 12, such as a memory or a hard disk, is used to store a plurality of arm sample images and a plurality of head regulation-violating sample images, wherein the arm sample image are images of two hands of a driver holding a steering wheel with various gestures, such as two parallel hands arranged, crossed arms with left arm on right and crossed arms with right arm on left, and wherein the head regulation-violating sample images are images of a driver using a mobile phone, smoking and eating. A processor 14 is electrically connected with the camera device 10 and the database 12. The processor 14 obtains the user image by the camera device 10, obtains the arm sample images and the head regulation-violating sample images from the database 12, compares the arm image of the user image with the arm sample images and compares the head behavior image with the head regulation-violating sample images, thereby determining whether a driving behavior is normal and generating a determination result. A transmission device 16, such as a power cable that can transmit wired signals or a wireless transmitter that can transmit wireless signals, is electrically connected with the processor 14 and transmits the determination result generated by the processor 14 to a computer host 20 used in a vehicle or arranged at a far-end. The embodiment exemplifies two computer hosts 20 respectively realized with a vehicular host 22 or a far-end server 24. The vehicular host 22 stores and displays the determination result received. The far-end server 24 stores the determination result received and shows it to a monitoring staff of the far-end server 24. Thus, the monitoring staff determines whether to warn the driver.

Figure 2:
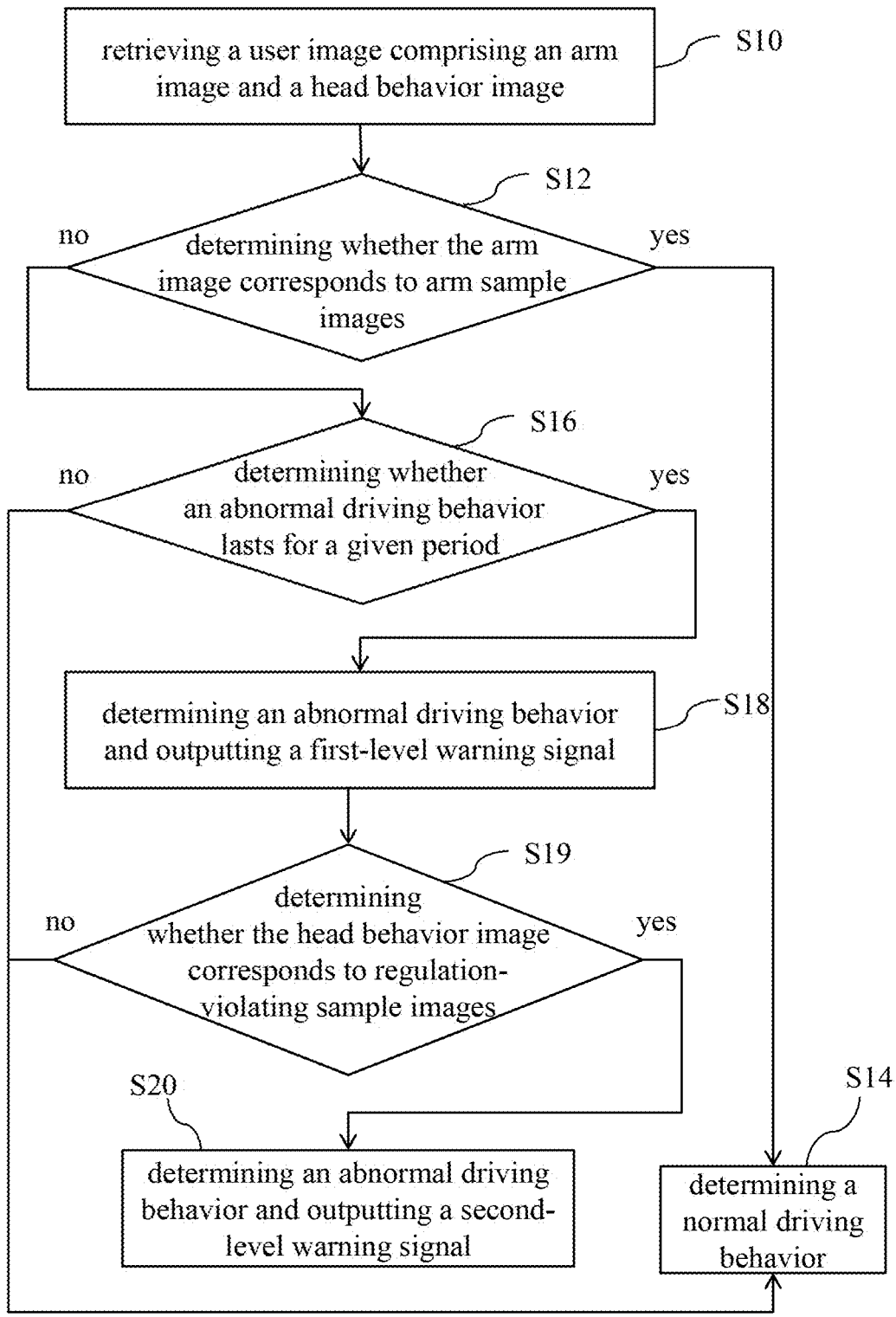
FIG. 2 is a flowchart of a method for detecting driving behavior according to an embodiment of the present invention.

After explaining the system of the present invention, the system of the present invention cooperates with a flow chart of a method for detecting driving behavior to detail the technology content. Refer to FIG. 1 and FIG. 2. Before the method of detecting driving behavior, a plurality of arm sample images and a plurality of head regulation-violating sample images are established in the database 12, whereby the processor 14 uses the data stored in the database 12 to compare. Then, the method of detecting driving behavior is performed. Firstly, in Step S10, the camera device 10 retrieves at least one user image comprising an arm image and a head behavior image. Next, in Step S12, the processor 14 retrieves the arm image and the arm sample images stored in the database 12 to compare. During the comparison process, a Gaussian mixture model (GMM) is used to convert the arm image into an image able to compare with the arm sample images, so as to benefit the processor 14 to compare. The GMM is expressed by:

$$g(x; \mu, \Sigma) = \frac{1}{\sqrt{(2\pi)^d |\Sigma|}} \exp\left[-\frac{1}{2}(x-\mu)^T \Sigma^{-1}(x-\mu)\right]$$

$$p(x) = \alpha_1 g(x; \mu_1, \Sigma_1) + \alpha_2 g(x; \mu_2, \Sigma_2) + \alpha_3 g(x; \mu_3, \Sigma_3)$$

Wherein $g(x; \mu, \Sigma)$ is Gaussian distribution density function, and x is a matrix formed by continuous frames of an arm position of the arm image, and $\mu$ is an average vector of x, and $\Sigma$ is a transposed conjugate matrix of and $\alpha_1$, $\alpha_2$ and $\alpha_3$ are weights. The arm image is converted by GMM and then compared with the arm sample images stored in the database 12, thereby determining whether the arm image corresponds to at least one of the arm sample images. If the processor 14 determines the arm image corresponds to at least one of the arm sample images, the process proceeds to Step 14 of determining a normal driving behavior. Simultaneously, the processor 14 generates a normal driving behavior signal and transmits the normal driving behavior signal to the far-end server 24 through the transmission device 16, so as to store the normal driving behavior signal and inform the backend staff of a normal driving behavior. If the processor 14 determines the arm image does not correspond to at least one of the arm sample images, the process proceeds to Step 16 of using the processor 16 to determine an abnormal driving behavior and determine whether the abnormal driving behavior lasts for a given period. If the answer is no, the process proceeds to Step S14 of determining a normal driving behavior. Simultaneously, the processor 14 generates a normal driving behavior signal and transmits the normal driving behavior signal to the far-end server 24 through the transmission device 16, so as to store the normal driving behavior signal and inform the backend staff of a normal driving behavior. If the answer is yes, the processor 14 determines the abnormal driving behavior lasts for a given period, such as 5 seconds. Thus, when the abnormal driving behavior lasts for 5 seconds, the process proceeds to Step S18 of generating a first-level warning signal. The first-level warning signal is transmitted to the far-end server 24 through the transmission device 16 to store the first-level warning signal and inform the monitoring staff at the backend. The monitoring staff can determine according to the first-level warning signal and the process proceeds to Step S19. Alternatively, the first-level warning signal is directly transmitted to the vehicular host 22 to remind the driver of concentrating to drive.

In Step S19, the processor 14 determines whether the head behavior image corresponds to at least one of the head regulation-violating sample images. During the determination process, GMM is used to convert the head behavior image into an image able to compare with the head regulation-violating sample images, and then the process determines whether the head behavior image corresponds to at least one of the head regulation-violating sample images. In the embodiment, comparing with the head behavior image is performed by retrieving characteristic points. The processor 14 retrieves image characteristics of the head behavior image to compare with comparison characteristics of the head regulation-violating sample images, wherein the comparison characteristics include mobile phones, cigarettes or the other things. The processor 14 determines whether the head behavior image includes the image characteristics such as mobile phones, cigarettes or the other things. If the head behavior image does not correspond to the comparison characteristics of the head regulation-violating sample images, the process proceeds to Step S14 of determining the normal driving behavior. If the head behavior image corresponds to the comparison characteristics of the head regulation-violating sample images, the abnormal driving behavior is determined. The driver may smoke or use a mobile phone. At this time, the process proceeds to Step S20. In Step S20, the processor 14 generates a second-level warning signal and transmits the second-level warning signal to the far-end server 24 through the transmission device 16, so as to inform the monitoring staff at the backend the driver has already been distracted. The monitoring, staff can warn the driver and record the present abnormal behavior of the driver. After generating the second-level warning signal, the processor 14 directly transmits the second-level warning signal to the vehicular host 22 in the vehicle of the driver. Then, the vehicular host 22 generates a sound warning signal or an image warning signal according to the second-level warning signal to remind the driver of an abnormal driving behavior, whereby the driver has to concentrate to drive.

The abovementioned head behavior image is provided to the processor 14 for comparing with the head regulation-violating sample images stored in the database 12 to determine whether the driver has a normal driving behavior. Besides, after or before Step S18, the processor 14 uses a head deflection algorithm to determine whether a head of a driver of the head behavior image is deflected. If the processor 14 determines the head is deflected, the processor 14 outputs the second-level warning signal and transmits the second-level warning signal to the far-end server 24 through the transmission device 16, so as to remind the monitoring staff at the backend. Alternatively, the processor 14 directly transmits the second-level warning signal to the vehicular host 22 in the vehicle through the transmission device 16, so as to warn the driver of concentrating to drive. If the head is not deflected, which indicates a normal driving behavior, the processor 14 generates a normal driving behavior signal and transmits it to the far-end server 24 through the transmission device 16, so as to inform the monitoring staff at the backend of the normal driving behavior.

Figure 3:
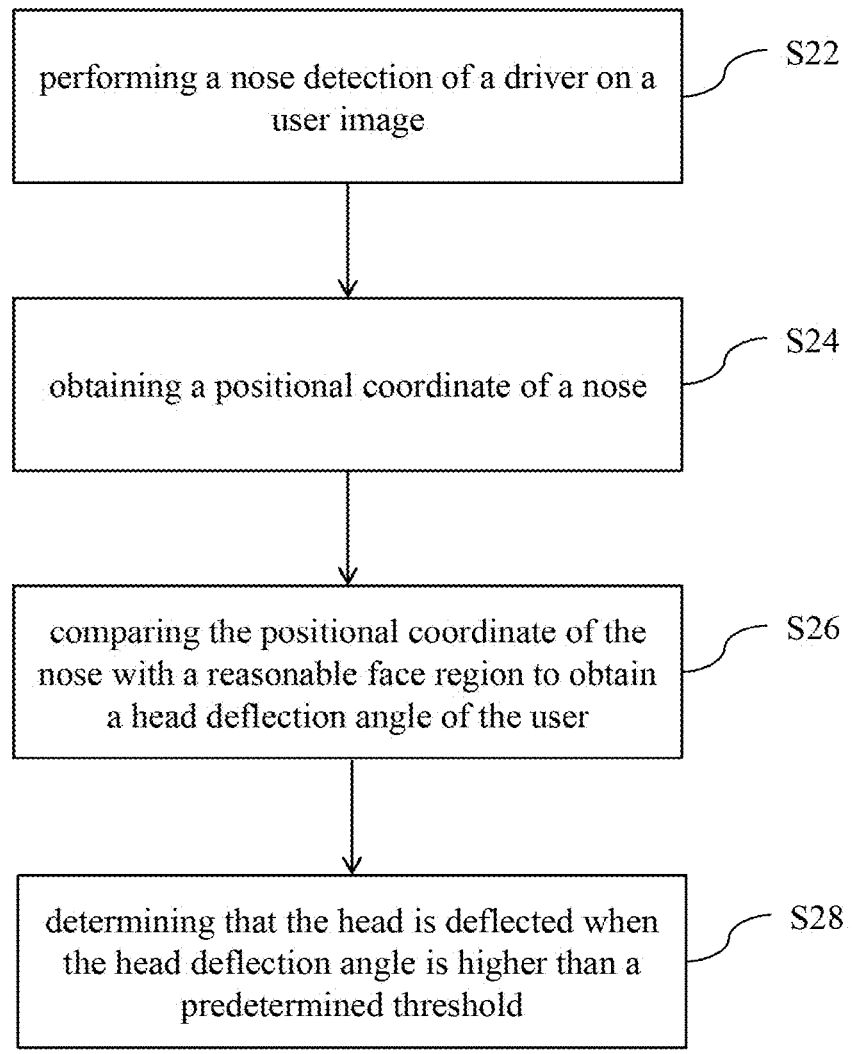
FIG. 3 is a flowchart of a head deflection algorithm according to an embodiment of the present invention.
Figure 4:
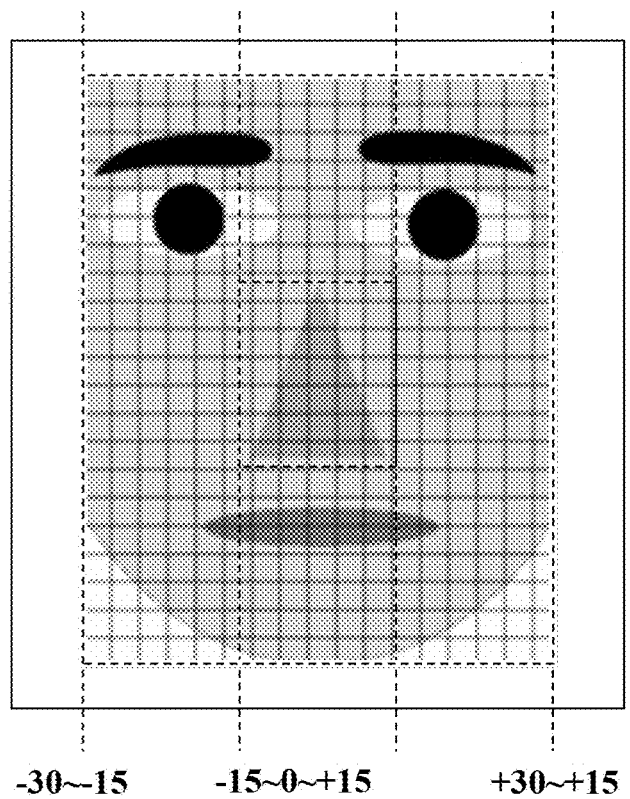
FIG. 4 is a diagram schematically showing an image used to determine head deflection according to an embodiment of the present invention.

The present invention uses a head deflection algorithm to determine whether the head is deflected. Refer to FIG. 3 and FIG. 4 to explain the head deflection algorithm. As shown in FIG. 4, a reasonable face region is predetermined when determining whether the head is deflected, and the reasonable face region is viewed as a squarely-facing face region. A positional coordinate of a nose is located on the middle of the squarely-facing face region. In Step S22, the processor 14 performs a nose detection of a driver on the present user image to detect a nose of the driver of the user image. Then, in Step S24, a positional coordinate of the nose, which is about 50% on the X axis, is obtained. After estimating the positional coordinate, the positional coordinate of the nose is about 140 on the X axis. Then, in Step S26, the positional coordinate of the nose is compared with a reasonable face region, so as to obtain a head deflection angle of the driver. When the head of the driver is deflected slightly at an angle of −15~−30 degrees, the position of the nose is shifted to 35% on the X axis of the squarely-facing face region. In other words, the positional coordinate of the nose is between 100 and 130 on the X axis. On the contrary, the nose having the positional coordinate of between 100 and 130 on the X axis infers that the head deflection angle of the driver is between −30 and −15 degrees. As a result, the head deflection angle of the driver is determined according to the shift position of the nose. Finally, in Step S28, the head deflection angle is higher than a given threshold such as 15 degrees, which indicates the head is deflected. In addition, a given serious threshold is preset, such as 30 degrees. When the head deflection angle is higher than 30 degrees, the head is seriously deflected.

Figure 5:
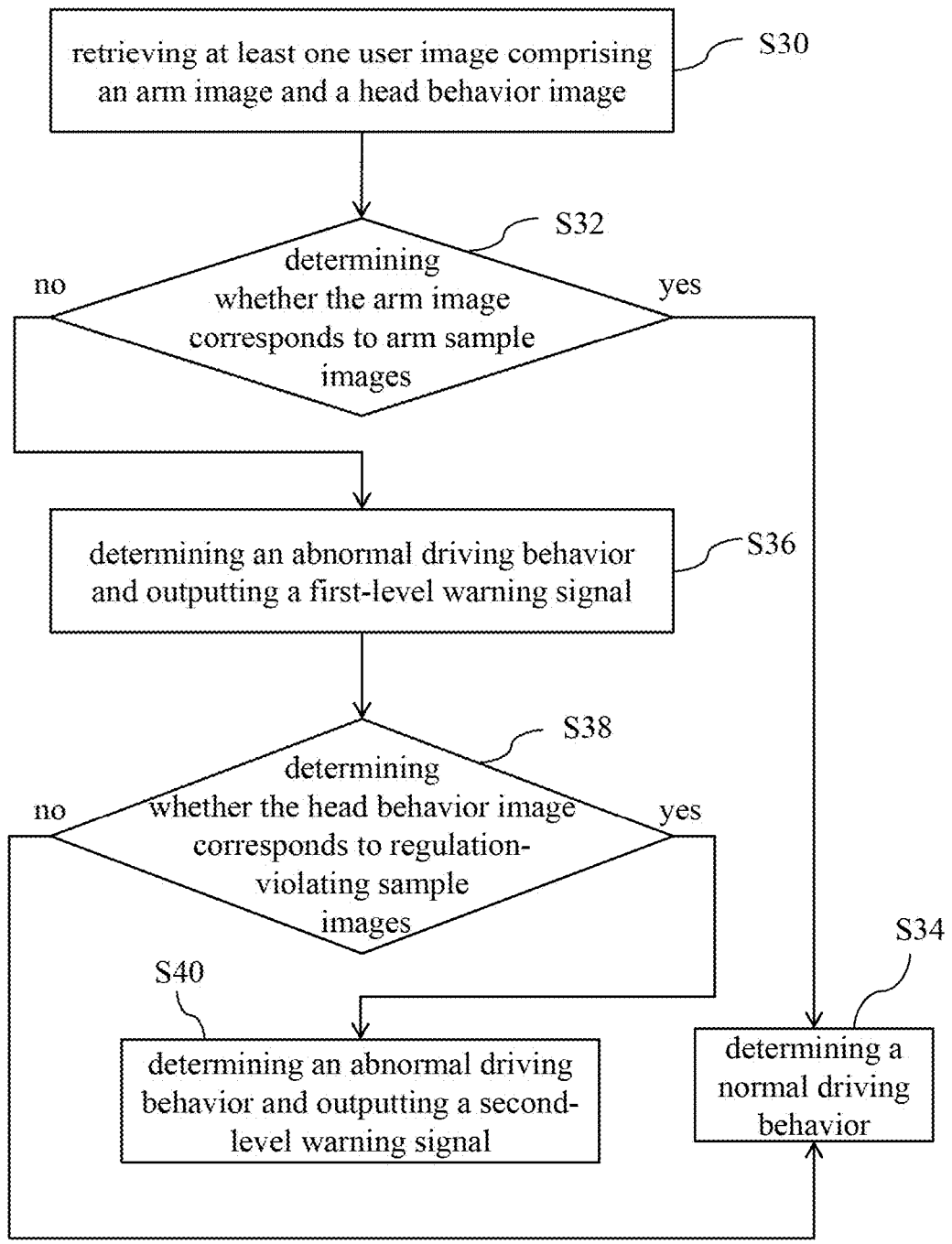
FIG. 5 is a flowchart of a method for detecting driving behavior according to another embodiment of the present invention.

Refer to FIG. 5. After the present invention determines the arm image does not correspond to at least one of the arm sample images, which indicates an abnormal driving behavior, the processor 14 does not determine whether the abnormal driving behavior last for a given period.

Specifically, as shown in FIG. 5, Steps S30-S34 are the same to Steps S10-S14 so will not be reiterated. The difference is that the process directly proceeds to Step S36 of generating the first-level warning signal when the arm image does not correspond to at least one of the arm sample images. That is to say, Step S16 is omitted. The embodiment directly generates the first-level warning signal and transmits it to the far-end server 24 through the transmission device 16. The far-end server 24 stores the first-level warning signal and informs the monitoring staff at the backend. Thus, the monitoring staff determines whether to warn the driver. Then, Steps S38-S40 are the same to Steps S19-S20 so will not be reiterated.

In conclusion, since the arm sample images are images of two hands of a driver holding a steering wheel, the arm image does not correspond to the arm sample images, which indicates the arms of the driver leave the steering wheel. The reason for leaving the steering wheel may be holding a mobile phone or a cigarette. As a result, the arms of the driver leave the steering wheel, which indicates a forward act of distracted driving. The present invention detects a forward act before an abnormal behavior of a driver, reminds the driver of concentrating to drive to efficiently improve the driving safety before the driver may be distracted from driving, and transmits the present behavior information of the driver to the far-end server, so as to provide the backend staff with monitoring and managing performance of drivers of a commercial motorcade, thereby apparently benefiting the driving safety.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for detecting driving behavior comprising:
retrieving at least one user image comprising an arm image and a head behavior image;
comparing said arm image with a plurality of arm sample images stored in a database to determine whether said arm image corresponds to at least one of said arm sample images:
if yes, determining a normal driving behavior; and
if no, determining an abnormal driving behavior and executing a step of;
generating and outputting a first-level warning signal; and
after outputting said first-level warning signal, comparing said head behavior image with a plurality of head regulation-violating sample images stored in said database to determine whether said head behavior image corresponds to at least one of said head regulation-violating sample images:
if no, determining a normal driving behavior; and
if yes, determining an abnormal driving behavior and generating and outputting a second-level warning signal.

2. The method for detecting driving behavior according to claim 1, wherein before said step of generating said first-level warning signal and after said abnormal driving behavior lasts for a given period, said first-level warning signal is generated, and said given period is 5 seconds.

3. The method for detecting driving behavior according to claim 1, wherein in said step of comparing said arm image with said arm sample images, a Gaussian mixture model (GMM) is used to convert said arm image into an image able to compare with said arm sample images, so as to benefit comparison.

4. The method for detecting driving behavior according to claim 1, wherein in said step of comparing said head behavior image with said head regulation-violating sample images, image characteristics of said head behavior image are retrieved to compare with comparison characteristics of said head regulation-violating sample images.

5. The method for detecting driving behavior according to claim 1, wherein after said step of comparing said head behavior image with said head regulation-violating sample images, using a head deflection algorithm is used to determine whether a head of a user of said head behavior image is deflected:
if yes, generating said second-level warning signal to warn said abnormal driving behavior; and
if no, determining said normal driving behavior.

6. The method for detecting driving behavior according to claim 5, wherein said head deflection algorithm comprises:
performing a nose detection of said user on present said user image;
obtaining a positional coordinate of a nose of said user;
comparing said positional coordinate of said nose with a reasonable face region to obtain a head deflection angle of said user; and
determining that said head is deflected when said head deflection angle is higher than a predetermined threshold being 15 degrees.

7. The method for detecting driving behavior according to claim 6, wherein said reasonable face region is a predetermined region or a squarely-facing face region.

8. The method for detecting driving behavior according to claim 1, wherein said arm sample images and said head regulation-violating sample images stored in said database are established before retrieving said at least one user image.

9. The method for detecting driving behavior according to claim 1, wherein said first-level warning signal and said second-level warning signal are transmitted to at least one computer host, and said at least one computer host is a vehicular host or a far-end server.

10. A system for detecting driving behavior comprising:
a camera device retrieving at least one user image comprising an arm image and a head behavior image;
a database storing a plurality of arm sample images and a plurality of head regulation-violating sample images; and
a processor electrically connected with said camera device and said database, and retrieving said arm image to compare with said arm sample images, and said processor determines a normal driving behavior when said arm image corresponds to at least one of said arm sample images, and said processor determines an abnormal driving behavior and generates and outputs a first-level warning signal when said arm image does not correspond to at least one of said arm sample images, and then said processor retrieves said head behavior image to compare with said head regulation-violating sample images after outputting said first-level warning signal, and said processor determines an abnormal driving behavior and generates and outputs a second-level warning signal when said head behavior image corresponds to at least one of said head regulation-violating sample images, and said processor determines a normal driving behavior when said head behavior image does not correspond to at least one of said head regulation-violating sample images.

11. The system for detecting driving behavior according to claim 10, wherein said processor generates said first-level warning signal after said abnormal driving behavior lasts for a given period being 5 seconds.

12. The system for detecting driving behavior according to claim 10, further comprising a transmission device electrically connected with said processor and controlled by said processor to output said first-level warning and said second-level warning signal.

13. The system for detecting driving behavior according to claim 12, further comprising at least one computer host receiving said first-level warning and said second-level warning signal from said transmission device and generating a sound warning signal or an image warning signal according to said first-level warning and said second-level warning signal.

14. The system for detecting driving behavior according to claim 13, wherein said at least one computer host is a vehicular host or a far-end server.

15. The system for detecting driving behavior according to claim 10, wherein said processor uses a Gaussian mixture model (GMM) to convert said arm image into an image able to compare with said arm sample images, so as to compare said arm image with said arm sample images.

16. The system for detecting driving behavior according to claim 10, wherein said processor retrieves image characteristics of said head behavior image to compare with comparison characteristics of said head regulation-violating sample images, so as to compare said head behavior image with said head regulation-violating sample images.

17. The system for detecting driving behavior according to claim 11, wherein said processor further uses a head deflection algorithm to determine whether a head of a user of said head behavior image is deflected:

if yes, generating said second-level warning signal to warn said user of said abnormal driving behavior; and if no, determining said normal driving behavior.

18. The system for detecting driving behavior according to claim 17, wherein said head deflection algorithm performs a nose detection of said user on present said user image, obtains a positional coordinate of a nose of said user, compares said positional coordinate of said nose with a reasonable face region to obtain a head deflection angle of said user, and determines that said head is deflected when said head deflection angle is higher than a predetermined threshold being 15 degrees.

19. The system for detecting driving behavior according to claim 18, wherein said reasonable face region is a predetermined region or a squarely-facing face region.

* * * * *